United States Patent [19]

Adorni et al.

[11] 4,332,436
[45] Jun. 1, 1982

[54] METHOD AND APPARATUS FOR CONSTRUCTING AN OPTICAL FIBER CABLE WHICH IS RESISTANT TO HIGH TEMPERATURES AND IS PERFECTLY WATERTIGHT, AND CABLE PRODUCED BY SUCH PROCESS

[75] Inventors: Napoleone Adorni; Pier L. Pizzolati, both of Milan, Italy

[73] Assignee: Cise S.p.A., Milan, Italy

[21] Appl. No.: 110,367

[22] Filed: Jan. 8, 1980

[30] Foreign Application Priority Data

Jan. 8, 1979 [IT] Italy ................................. 9310 A/79

[51] Int. Cl.$^3$ ............................................... G02B 5/14
[52] U.S. Cl. ..................... 350/96.23; 57/350
[58] Field of Search ................. 350/96.23; 57/350

[56] References Cited

U.S. PATENT DOCUMENTS

| | | | |
|---|---|---|---|
| 3,955,878 | 5/1976 | Nowak | 350/96.23 |
| 4,153,332 | 5/1979 | Longoni | 350/96.23 |
| 4,248,035 | 2/1981 | Skillen et al. | 350/96.23 X |

*Primary Examiner*—John D. Lee
*Attorney, Agent, or Firm*—Hopgood, Calimafde, Kalil, Blaustein & Judlowe

[57] ABSTRACT

An improved process for producing a protected optical fiber cable and the cable produced thereby. The process for producing the cable includes the insertion of a relatively thin optical fiber within a relatively large metal tube by means of flowing a fluid around the fiber and through the tube. As the water flows within the tube, the optical fiber becomes progressively entrained within the tube. Additional steps of coating the fiber with a releasable protective coating and unwinding the fiber from a reel within a container are also disclosed.

12 Claims, 4 Drawing Figures

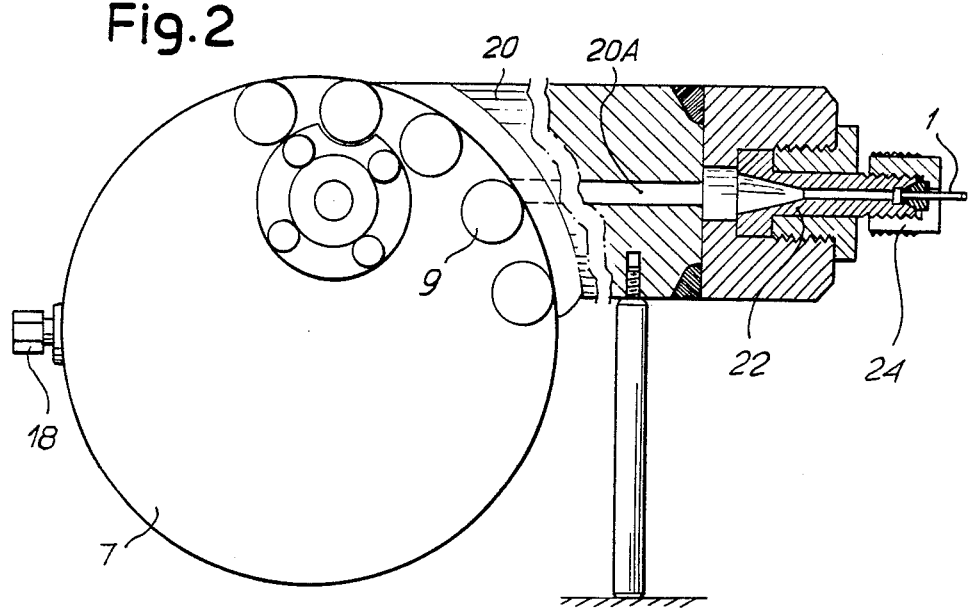
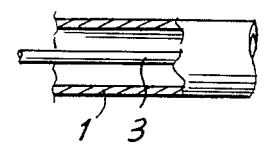
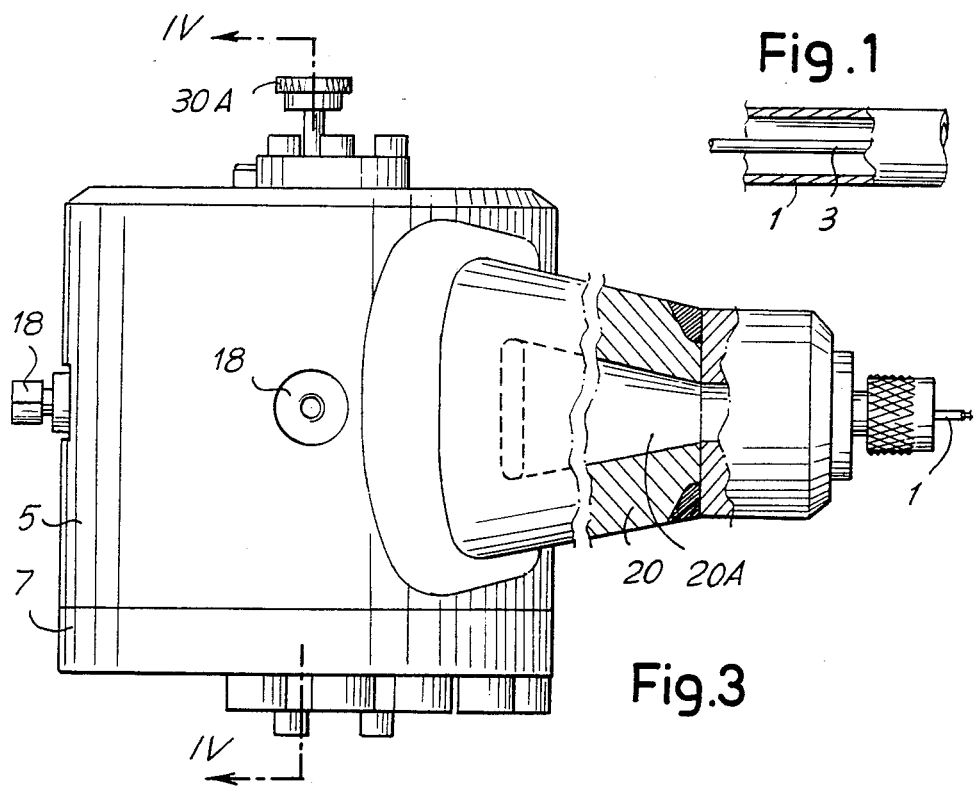

METHOD AND APPARATUS FOR CONSTRUCTING AN OPTICAL FIBER CABLE WHICH IS RESISTANT TO HIGH TEMPERATURES AND IS PERFECTLY WATERTIGHT, AND CABLE PRODUCED BY SUCH PROCESS

BACKGROUND AND SUMMARY OF THE INVENTION

In the construction of a certain type of instrument it is necessary to have a very long optical cable, on the order even of from a few hundred meters to 2500–3000 meters, which is able to withstand high temperatures—even of more than 500° C.—and high pressures of up to 250 bar, and which is water-and gastight and also resistant to corrosion.

Individual optical fibers of quartz of low attenuation and indefinite length, without covering, are available, which are suitable from an optical standpoint but are not suitable in themselves for certain applications.

The first object of the present invention is a protected optical fiber cable which is formed of at least one optical fiber contained in a sheathing consisting of a metallic capillary tube. The transverse dimension–particularly the diametral dimension—of the capillary metallic tube is, in practice, of a larger order of magnitude than the optical fiber or of each optical fiber contained in it. The optical fiber may have diametral dimensions on the order of 100 $\mu$m and the metallic capillary tube a diameter on the order of 1.7 mm.

A second object of the invention is a process of producing an optical fiber cable as defined above having at least one optical fiber within a capillary metallic tube.

In accordance with this process, a flow of a fluid is established in said tube in order to entrain the optical fiber into the tube.

In practice, an initial length of optical fiber is inserted into the capillary metallic tube and thereupon a flow of a liquid—such as water, distilled water, or the like—is established under pressure in the tube in order to effect a progressive pulling of the optical fiber into the tube.

Still another object of the invention is an apparatus for producing an optical fiber cable such as defined above by the use of the aforementioned process. This apparatus comprises a hollow body containing a reel on which the optical fiber is wound, a mouth which widens towards the inside of the hollow body in order to receive the fiber as it is unwound, a chuck, to engage in watertight manner the end of the metallic capillary tube, and a pump adapted to introduce into the inside of said hollow body a liquid under high pressure which flows through the mouth and the tube.

Advantageously a brake is provided on the reel in order to adjust the unwinding of the optical fiber entrained by the flow of fluid; said brake may be of the magnetic induction type, with a magnet facing a disk or ring of copper or the like.

The apparatus may comprise a means for measuring the unwinding of the optical fiber, in particular a means for measuring the revolutions of the reel, in the form of a magnetic ring driven along by induction by the reel, without contact.

The apparatus may furthermore comprise within the hollow body at least one window of transparent thickness in order to monitor the inside of the cavity.

BRIEF DESCRIPTION OF THE DRAWING

The invention will be better understood from the following description and the accompanying drawing which shows one practical non-limitative embodiment of the invention. In the drawing:

FIG. 1 shows a length of optical cable;

FIGS. 2, 3 and 4 show the apparatus in various views and partial sections.

DESCRIPTION OF THE PREFERRED EMBODIMENTS

Figure 4:
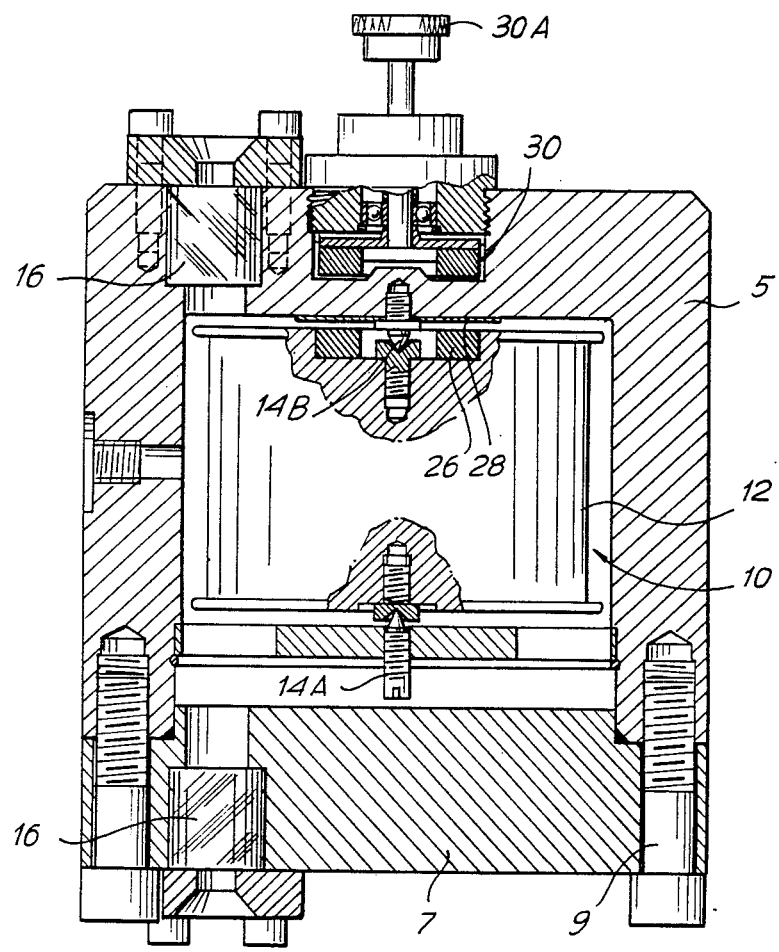

In FIG. 1, 1 is a metal tube of capillary dimensions on the order of 1 to 2 mm in diameter, and 3 is an optical fiber of a diameter of an order of magnitude smaller than the tube, for instance on the order of 100 $\mu$m.

In order to be able to introduce a fiber 3 into the capillary metallic tube 1 of a material suitable for the conditions of use and a diameter greater than the diameter of the fiber by an order of magnitude as stated above, it has been contemplated to have the optical fiber entrained within the capillary by a stream of fluid, which is placed under pressure; distilled water has been advantageously employed.

In order to carry out this process, an apparatus has been provided, such as shown in the accompanying drawing, designed for 150 bar, in which there is contained a reel on which the bare optical fiber has been previously wound.

By two parts 5 and 7, connected by screws 9, there is formed a cavity 10 adapted to receive a reel 12 of suitable diameter for the optical fiber; said reel is borne by the center points 14A, 14B, one of which 14A, is adjustable and removable; inspection windows of transparent thickness 16 are provided at several points.

18 are connections for a high-pressure pump.

20 is an appendage which forms a fan-shaped mouth 20A which is developed with an opening which corresponds at least to the axial dimension of the reel and is directed approximately tangentially to the reel 12. The mouth 20A via a coupling 22 is combined with a chuck 24 adapted to engage the tube 1.

After the reel 12 has been mounted within the apparatus, as long a length as possible of fiber (in practice a few tens of centimeters) is introduced manually into the capillary tube 1; thereupon the apparatus is closed and water is started to be pumped into the apparatus by means of a pump of suitable characteristics, for instance of a type suitable for carrying out hydrostatic tests on pressure components. The fiber 3 is carried along by the flow and gradually enters the capillary 1, unwinding from the reel 12.

In order to moderate the speed of the reel 12, there is inserted in it an annular magnet 26 of ferrite, arranged a short distance away from a disk 28 of copper fastened to the part 5 of the housing; in this way there is obtained an electromagnetic brake which is very effective in preventing excess speed of the reel, with possible resultant entangling of the fiber if for any reason the fiber should decrease its speed of introduction into the capillary. The same magnetic ring 26 as serves as brake is used to drive along a similar ring 30 located on the outside of the part 5 which serves either as external indicator of rotation or in order to operate the reel 12 manually by means of a handle 30A.

The two transparent windows 16 (of pyrex or other glass) make it possible visually to observe the course of the fiber within the apparatus.

The fiber may be provided with a protection of silicone or the like which is adapted to assure mechanical resistance during the process and which may then be eliminated by heat or solvents or the like. When several fibers are provided, said protection can be used to hold the fibers together during the insertion.

In one experimental test we succeeded in threading a quartz fiber of 100 μm diameter into a capillary of a length of 150 m having an inside diameter of 1.7 mm, wound on a diameter of about 0.8 m. The time necessary was about half an hour. The water pressure was a few dozen bars; upon increasing the pressure up to 150 bars with a capillary which is able to withstand such pressure, no particular difficulties were encountered in carrying out the operation up to the maximum length contemplated.

It is understood that the drawing shows merely one example, given solely as a practical demonstration of the invention, which may be varied in form and arrangement without thereby going beyond the scope of the concept which forms the basis of the invention.

We claim:

1. A process for the production of a sheathed optical fiber cable comprising the steps of:
   providing a metallic tube to form the sheath of said cable, said tube being of a length corresponding to the desired cable length;
   holding said tube;
   positioning a first portion of said optical fiber within a first portion of said tube; and
   providing a flow of fluid around said optical fiber and within said tube to exert a progressive entrainment of the optical fiber within said tube.

2. The process as claimed in claim 1 further including the step of unwinding said optical fiber from a reel of said fiber.

3. The process as claimed in claim 2 further including the step of braking the rotation of said reel of said optical fiber to provide a resistance to its entrainment within said cable.

4. The process as claimed in claim 2 further including the step of counting the number of turns made by said reel as said fiber is entrained within said cable to provide a measurement of how much cable has been produced.

5. The process as claimed in claim 1 further including the step of enclosing said fiber within a container, said metal tube being attached to said container and said fluid flowing into said container and thereafter into said tube.

6. The process as claimed in claim 1 further including the steps of coating said fiber with a protective coating to increase the mechanical resistance of said fiber and removing said coating by the application of external means.

7. The process as claimed in claim 6 further including the step of heating said optical fiber to eliminate said protective coating.

8. The process as claimed in claim 6 further including the step of applying a solvent to said optical fiber to remove said protective coating.

9. The process as claimed in claim 1 further including the step of providing another strand of optical fiber within said tube.

10. The process as claimed in claim 1 further including the step of providing an additional length of said fiber greater than the length of said metal tube in order to provide freedom from mechanical stresses due to temperature variations during use.

11. The optical fiber cable produced by the process of claim 1.

12. The process as claimed in claim 1 wherein said fluid comprises a liquid.

* * * * *